United States Patent Office 3,159,491
Patented Dec. 1, 1964

3,159,491
CHEWING GUM CONTAINING POLYOLEFINES
Marvin H. Mahan, 2250 Woodland Terrace, Scotch Plains Township, Union County, N.J.
No Drawing. Filed Mar. 7, 1962, Ser. No. 177,971
4 Claims. (Cl. 99—135)

This invention relates to chewing gum. More particularly, this invention is concerned with the use of certain polyolefine resins as a chewing gum base, preferably in combination with confectionery supplements, and to methods of masticating with such products.

This invention is a continuation-in-part of co-pending application for Chewing Gum Base, Serial Number 88,252, filed February 10, 1961, and now abandoned.

Chewing gum may be considered fundamentally as a confectionery dry tablet containing a masticatory gum and confectionery supplements, such as sugar, glucose, flavoring material and the like. The masticatory gums employed in chewing gum manufacture are referred to as chewing gum bases. Such bases require dual mechanical properties typical for the utilization to which they are put. For example, at body temperature and practically 100% humidity, the conditions which prevail in the mouth, the chewing base must be soft and "chewy," but not sticky. On the other hand, it is desirable that under storage conditions the base be firm and rather stiff. Or stated somewhat differently, a chewing gum base must be a solid substance at room temperature (about 25° C.) and soften at body temperature (37° C.) into a visco-elastic material. In addition to these basic considerations, there are certain secondary, but also important, properties such as cohesion, wetting, etc.

It is usually not possible to achieve the combination of properties necessary in a chewing gum base with an amorphous polymer, since any amorphous polymer whose softening point is sufficiently low for it to exhibit the required properties at body temperature, would also be subject to viscous flow at room temperature and hence would not retain its shape during storage. In commercial chewing gum bases the desired combination of mechanical properties is usually achieved by the expedient of using a mixture of several ingredients, one of which may be a crystalline material which provides firmness at low temperatures, but melts out at slightly elevated temperatures. This crystalline material is incorporated with the rubbery chewing gum base that provides the chief visco-elastic resistance to chew at slightly elevated temperatures. At the present time chewing gum bases are usually made by combining natural and synthetic resins with other materials to give the necessary properties.

The compounding of chewing gum bases under present practice has become an art peculiar to the individual manufacturer who finds that a particular balance of substances is necessary in order to achieve the particular properties which he thinks is desirable. But in all combinations that are being used, the basic materials require substances of the character set forth above, which supply different materials to provide the dual and multiple properties necessary in such compositions. Insofar as reliance is placed on natural occurring materials, control of the characteristics of the product is not always simple. In the use of any natural product, variations necessarily occur in the ultimate product produced. Furthermore sources of supply are not always regular.

It has been discovered, unexpectedly, that materials ideally suited for use as chewing gum base constituents are the substantially non-crystalline, hydrocarbon soluble, polyolefine resins which are advantageously separated as by-products from the crystalline polyolefine resins during manufacture by low pressure catalytic polymerization processes. It is an advantage of this invention that the substantially non-crystalline polymer obtained as a by-product may be admixed with a sufficient quantity of crystalline polymer to give it that particular balance of properties necessary to achieve optimum properties for a chewing gum base. In general, the mixture will contain at least 50% of the non-crystalline resin.

The low pressure catalytic polymerization processes particularly suited for obtaining this material are those processes known in the art as the Ziegler process and the Phillips process, as well as industrial modifications thereof, as described in the book Polyolefine Resin Processes, by Marshall Sittig, Gulf Publishing Co., Houston, Texas (1960).

In the Ziegler process a high density, high molecular weight polyolefine is obtained by polymerizing an olefine, using a catalyst made from a reaction between two different metallic compounds: the catalyst proper, picked from compounds composed of groups IV–VIII transition elements; and the cocatalyst, coming from groups I–III metal hydrides, or alkyls which can make hydride ions or carbanions. The usual conditions are near-atmospheric pressure, and temperatures of 50° to 75° C. The metal halide is added to the metal alkyl in a solvent, usually a hydrocarbon such as n-heptane. As the catalyst components react under agitation, a colored colloidal dispersion of precipitated complex forms. The operation is done under a nitrogen blanket. Polymerization can be done in the same or a different reactor from that used to make the catalyst. Ethylene or other monomer is then added to the reaction vessel under slight pressure. Cooling removes the heat of reaction. The crystalline polymer forms as a powder, or as granules, which are insoluble in the hydrocarbon solvent at the reaction temperature. The polymer which remains in solution is the non-crystalline polyolefine which is suitable as a chewing gum base. The solid crystalline polymer which has separated may also be extracted with a hot solvent, preferably a hydrocarbon solvent such as n-heptane or xylene, to remove any additional non-crystalline polymer contained therein.

Operation at atmospheric or near-atmospheric pressure is an essential feature of this process. But the process can be run at higher pressures and temperatures. Heptane is a common solvent. Reaction times between one and four hours will give products with molecular weights from 20,000 to 1 million. The actual average degree of polymerization depends on the polymerization conditions, and is susceptible to control within certain limits by varying the temperature, especially when operating within the upper part of the range of temperatures between —80° and +230° C., and under atmospheric pressure, or a pressure of a few atmospheres. The average degree of polymerization can, with certain limits, also be influenced by varying the ratio of the amount of the compound of the transition metal to the amount of the organo-metallic compound used in preparing the catalyst.

Detailed studies of the molecular structure of high-density crystalline polyolefine polymers made by this process have been made by infrared spectroscopy, X-ray diffraction and nuclear magnetic resonance methods. The crystalline material has been found to have a substantially linear polymethylene chain terminated by a vinyl group at one end and a methyl group at the other end. Fractionation studies have indicated a broad molecular weight distribution and a high content of low molecular weight material. In the case of polypropylene, stereospecific catalysis occurs. These polymers are shown to be highly crystalline with high softening points, the unique properties depending on the configuration of the monomer units with respect to one another along the polymer chain.

The above process is also used to polymerize higher molecular weight 1-olefines, such as butene-1 and 4- methylpentene-1, as well as to form copolymers of ethylene with propylene, butene-1 and the like.

In the Phillips process metal oxide catalysts—chromium oxide with at least one other oxide from the silica, alumina, zirconia, or thoria groups are used. The chromium is usually hexavalent. The preferred support for the chromia is a silica-alumina composite. The support can be pretreated with a fluoride such as ammonium fluoride and heated to remove residual fluoride. Strontium oxide will retard the decline of activity of the catalyst.

The supported chromium oxide catalyst polymerizes all 1-olefines with branching no closer than the C–4 position to the double bond and containing eight carbon atoms or less. Operating temperatures range from 150° to 400° F. Pressures may range from 300 to 700 p.s.i., but 500 p.s.i. is most common. The feed rate may run from 0.1 to 20 liquid hourly space velocity. Preferred reaction diluents are paraffins or cycloparaffins. There are several variations in actual operation—fixed bed, moving bed, fluidized bed, or as a slurry process. Reaction temperatures, catalyst particle size, and catalyst regeneration are varied to meet the suitable operating method.

The crystalline polymer can be separated from the polymer solvent by evaporating the solvent and extracting the tacky polymer with a solvent such as n-pentane at room temperature. Another method is to cool the total reactor effluent from the polymerization temperature to about 150° F., precipitating out most of the crystalline polymer.

Commercial modifications of this process use other metal oxide catalysts in conjunction with metal halides, metal alkyls, and metal hydrides. Many other metal catalysts, for example, a molybdenum-alumina catalyst which contains 8% molybdena on alumina, Friedel-Crafts catalysts, boron compounds, and the like, have been proposed.

After separation of the substantially crystalline polyolefine prepared by the above described low pressure catalytic processes, for example, in a filter or centrifuge, the substantially non-crystalline polyolefine which is useful as a chewing gum base is recovered from the filtrate containing the soluble, solvated and suspended solids by removal of the solvent by suitable means. In a preferred embodiment of my invention the solvent is removed by slurrying the filtrate in water and removing the volatile solvent by steam distillation. This leaves a plastic solid material which is removed mechanically and dried. The plastic solid which is the chewing gum base has a density below about 0.95 gram per cubic centimeter and may contain an amount up to 50% of the crystalline polyolefine. Solvent extraction of a typical polyolefine by-product shows 10% to 20% acetone extractable; 60% to 70% toluene extractable; and 20% non-toluene and non-acetone extractable material. These polyolefine by-products show the dual properties of base firmness due to the firm structure at room temperature and viscoelastic properties at body temperature. These polyolefine resins possess in a satisfactory degree the additional properties of eutectics, melting point characteristics, elasticity, stability, set-up, friability, fluidity and chewing characteristics desirable for chewing gum bases. Furthermore, these resins are free from undesirable taste, toxicity, and such other physical characteristics which would make them unsuitable for use in chewing gum bases.

While not being limited to any theory concerning the structural characteristics of such polymeric resins, the good physical properties for the desired purpose possibly may be explained by the fact that these non-crystalline resins embody a variety of molecular configurations. Polypropylenes in which the adjacent asymmetric carbon atoms possess identical optical configurations are termed "isotactic"; those with alternating $d$ and $l$ configurations, "syndyotactic" and those with random orientation along the chain "atactic." Polypropylenes having atactic structures are amorphous, rubbery materials, which have low second-order transition temperatures and undistinguished mechanical properties, whereas isotactic polypropylene polymers are highly crystalline polymers with high melting points (first-order transition temperatures). Stereoblock polymers, consisting of chains in which isotactic sections alternate with sections having random steric configurations, have properties that are determined by the relative properties of these two types of enchainment present, and certain of these polymers are elastomers with high elastic elongation and low initial elastic modulus.

The most general composition of the chewing gum base materials made by the above described processes consists of a low melting, non-crystalline polyolefine resin which may contain a high-melting polyolefine crystalline resin in amounts up to 50% of the total weight. An elastomer may be added as blending agent, or as regulator of solubilities. These polymers are primary ingredients and may be used by themselves or with the addition of certain secondary ingredients, which are desirable but not essential for chewing gum bases. The polyolefine resins herein described may, when combined with a natural or synthetic crystalline resin, display a mutual solubility.

In a preferred embodiment of our invention one or more confectionery supplements such as sugar, glycose, flavoring material and the like are incorporated into the above described chewing gum base materials. This may be accomplished, for example, by milling or kneading the ingredients in the dry state, or by various cooking processes, in which the confectionery materials are generally in the fluid state, i.e. in syrup form, when blended with the polyolefine resin. In these products, the polyolefine resin imparts a structure which makes the entire mass firm and rigid in the commercial slab or pellet of chewing gum. However, the gum becomes soft at mouth temperature, there being a narrow temperature range between the rigid solid state and the plastic condition.

The following examples illustrate two cooking methods. In these formulas it is understood that the proportions are given solely for purposes of illustration and not of limitation, and that these proportions can be modified to give the desired properties of the finished material. The specific selections of the confectionery supplements are merely illustrative.

*Example 1*

| | Lbs. |
|---|---|
| Polyethylene resin | 1 |
| Sugar | 2 |
| Glucose | 1 |
| Caramel butter | 1 |

Mash and soften the gum at a gentle heat. Place the sugar and glucose in a small pan, add enough water to dissolve the sugar, set on a fire and cook to 244° F. Lift the syrup off the fire, add to it the caramel butter and lastly the gum. Mix well into a smooth paste, roll out on a smooth marble and dust with finely powdered sugar. Run through a sizing machine of the thickness desired, cut into strips and again into thin slices to obtain chewing gum sticks.

The polyethylene resin in the above formula is obtained as a by-product during the manufacture of crystalline polyethylene by low pressure catalytic polymerization processes. It has a density below about 0.95 gram per cubic centimeter, and at least 50% by weight of the resin exists in a non-crystalline form.

In accordance with the above procedure, but replacing the polyolefine resin with a polypropylene resin, or with a copolymer of ethylene and propylene, which is similarly obtained and has like properties with respect to density and crystallinity, there is obtained a chewing gum confectionery product having the desired masticatory properties.

Example 2

| | | |
|---|---|---|
| Polyethylene resin | lbs | 3½ |
| Paraffin wax | lb | 1 |
| Tolu balsam | oz | 2 |
| Peru balsam | oz | 1 |

Mash and soften the polyethylene resin and the paraffin at a gentle heat. Add 10 lbs. of finely granulated sugar and 4 lbs. of glucose to 3 pints of water. Dissolve and boil to "crack" degree (confectioners' term). Pour the syrup over an oil slab and turn into it sufficient of the above resin mixture to make it tough and plastic, adding any of the following flavors, if desired: cinnamon, chocolate, sandalwood, myrrh, or ginger.

The polyethylene resin in the above formula is obtained as a by-product during the manufacture of crystalline polyethylene by low pressure catalytic polymerization processes. It has a density below about 0.95 gram per cubic centimeter, and at least 50% by weight of the resin exists in a non-crystalline form.

In accordance with the above procedure, but replacing the polyolefine resin with a polypropylene resin, or with a copolymer of ethylene and propylene, which is similarly obtained and has like properties with respect to density and crystallinity, there is obtained a chewing gum confectionery product having the desired masticatory properties.

The manufacture of chewing gum is by no means the simple operation that it may seem upon examination of a particular formula. Considerable experience in manipulation is necessary to success, and published formula can at best serve as a guide rather than something to be absolutely and blindly followed. For example, if the mass is either too hard or soft, the proportions of the ingredients may be changed until the desired properties are obtained.

The above described chewing gum base alone, or preferably the chewing gum confections prepared as described above, are eminently suited for utilization as chewing gum, and are masticated by the consumer in the same manner as the usual commercial chewing gum product. Various changes and modifications may be made in carrying out the present invention without departing from the spirit and scope thereof. Insofar as these changes and modifications are within the purview of the annexed claims, they are to be considered as part of my invention.

I claim:

1. A chewing gum composition consisting essentially of a
   (1) sweetener,
   (2) flavoring material, and
   (3) a mixture of the amorphous and crystalline forms of a solid polymer of a 1-olefine selected from the group consisting of
      polyethylene,
      polypropylene, and
      a copolymer of ethylene and propylene,
   said polymer mixture having a density below about 0.95 gram per cubic centimeter,
   and having the crystalline form of the polymer present in an amount less than 50% of the total weight.

2. The composition of claim 1 wherein said polymer is polyethylene.

3. The composition of claim 1 wherein said polymer is polypropylene.

4. The composition of claim 1 wherein said polymer is a copolymer of ethylene and propylene.

References Cited by the Examiner

UNITED STATES PATENTS

| | | | |
|---|---|---|---|
| 2,124,235 | 7/38 | Mueller-Cunradi et al. | 99—135 X |
| 2,284,804 | 6/42 | De Angelis | 99—135 |

FOREIGN PATENTS 538,782  12/55  Belgium.

A. LOUIS MONACELL, *Primary Examiner.*

BEATRICE H. STRIZAK, *Examiner.*